United States Patent
Hao

(10) Patent No.: US 9,933,673 B2
(45) Date of Patent: Apr. 3, 2018

(54) LIQUID CRYSTAL DISPLAY PANEL, ARRAY SUBSTRATE AND MANUFACTURING FOR THE SAME

(71) Applicant: Shenzhen China Star Optoelectronics Technology Co., Ltd., Shenzhen, Guangdong (CN)

(72) Inventor: Sikun Hao, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 163 days.

(21) Appl. No.: 14/914,253

(22) PCT Filed: Jan. 29, 2016

(86) PCT No.: PCT/CN2016/072663
§ 371 (c)(1),
(2) Date: Feb. 24, 2016

(87) PCT Pub. No.: WO2017/117834
PCT Pub. Date: Jul. 13, 2017

(65) Prior Publication Data
US 2017/0255070 A1    Sep. 7, 2017

(30) Foreign Application Priority Data

Jan. 5, 2016 (CN) .......................... 2016 1 0009748

(51) Int. Cl.
*G02F 1/1335* (2006.01)
*G02F 1/1362* (2006.01)
(Continued)

(52) U.S. Cl.
CPC ...... *G02F 1/136209* (2013.01); *G02F 1/1368* (2013.01); *G02F 1/133345* (2013.01);
(Continued)

(58) Field of Classification Search
CPC ............. G02F 1/136209; G02F 1/1368; G02F 1/136227; G02F 1/134309; G02F 1/133345; G02F 1/134363; G02F 1/136286; G02F 2201/123; G02F 2001/136222; G02F 2001/136231; G02F 2201/121
(Continued)

(56) References Cited

U.S. PATENT DOCUMENTS 5,949,509 A * 9/1999 Ohe .................. G02F 1/133788
324/760.01
8,842,108 B2 * 9/2014 Lee ................... G02F 1/134363
345/206
(Continued)

*Primary Examiner* — Hoan C Nguyen
(74) *Attorney, Agent, or Firm* — Andrew C. Cheng

(57) ABSTRACT

A liquid crystal display panel, an array substrate and a manufacturing method for the same are provided. Designing a black matrix for light shielding, and an insulation layer between a pixel electrode and other structures in order to reduce the type and the number of the masks, simplify the manufacturing process and decrease the production cost. Besides, a distance between the black matrix located above a data line and the data line is shorten such that lights of a pixel emitting out through an adjacent pixel is avoided in order to reduce the light leakage at a large viewing angle.

10 Claims, 4 Drawing Sheets

(51) Int. Cl.
*G02F 1/1368* (2006.01)
*G02F 1/1343* (2006.01)
*G02F 1/1333* (2006.01)

(52) U.S. Cl.
CPC .. *G02F 1/134309* (2013.01); *G02F 1/134363* (2013.01); *G02F 1/136227* (2013.01); *G02F 1/136286* (2013.01); *G02F 2001/136222* (2013.01); *G02F 2001/136231* (2013.01); *G02F 2201/121* (2013.01); *G02F 2201/123* (2013.01)

(58) Field of Classification Search
USPC .......................................... 349/141, 43, 106
See application file for complete search history.

(56) References Cited

U.S. PATENT DOCUMENTS

| | | | |
|---|---|---|---|
| 9,274,390 B2* | 3/2016 | Chang | G02F 1/136209 |
| 2006/0146254 A1* | 7/2006 | Kim | G02F 1/134363 |
| | | | 349/141 |
| 2008/0239215 A1* | 10/2008 | Chae | G02F 1/134363 |
| | | | 349/107 |
| 2009/0059134 A1* | 3/2009 | Ishikawa | G02F 1/134363 |
| | | | 349/96 |
| 2009/0121234 A1* | 5/2009 | Jeon | G02F 1/1368 |
| | | | 257/72 |

* cited by examiner

LIQUID CRYSTAL DISPLAY PANEL, ARRAY SUBSTRATE AND MANUFACTURING FOR THE SAME

BACKGROUND OF THE INVENTION

1. Field of the Invention

The present invention relates to a liquid crystal display technology, and more particularly to an array substrate, manufacturing for the same and a liquid crystal display panel having the array substrate.

2. Description of Related Art

Currently, a manufacturing process of a liquid crystal display (LCD) is complicated. Especially, layered structure of a liquid crystal display panel is more. For example, as shown in FIG. 1, a liquid crystal display panel 10 includes a first substrate 11 and a second substrate 12 which are disposed oppositely and at an interval, and a liquid crystal 13 filled between the first substrate 11 and the second substrate 12. The first substrate 11 includes a TFT (Thin Film Transistor) 111, a data line 112, a first planarization passivation layer (Over coat layer) 113, a color filter layer 114, a second planarization passivation layer 115, a pixel electrode 116 and a common electrode 117. The second planarization passivation layer 115 is also called as a PFA (Polytetra-fluoro-Ethylene) layer. The second substrate 12 includes a black matrix 121 and a third planarization passivation layer 122. The above shows that the type and the number of masks for manufacturing the above layered structures are more, manufacturing process is complicated and the production cost is high.

Besides, because the common electrode 117 and the black matrix 121 for light shielding are respectively disposed at two substrates, a distance of the common electrode 117 and the black matrix 121 is farther so that when viewing at a large viewing angle, lights of a pixel (indicated as an arrow in the figure) will emit out through an adjacent pixel so that a light leakage is easily to be generated when viewing at a large viewing angle.

SUMMARY OF THE INVENTION

Accordingly, the present invention provides a liquid crystal display panel, an array substrate and a manufacturing method for the same, which can reduce the type and the number of the masks and reduce the light leakage at a large viewing angle.

The present invention provides a manufacturing method for an array substrate, comprising: sequentially forming a gate electrode, an insulation layer and an active semiconductor layer on a base substrate; forming a source electrode and a drain electrode on the active semiconductor layer; forming a data line on the insulation layer; forming a planarization passivation layer on the source electrode, the drain electrode, the data line and the insulation layer, and the planarization passivation layer is provided with a first contact hole that reveals a surface of the drain electrode; forming a black matrix on the planarization passivation layer, wherein, the black matrix includes a first region and a second region, the first region of the black matrix is correspondingly located above the source electrode and the drain electrode, the second region of the black matrix is correspondingly located above the data line, and the first region of the black matrix is provided with a second contact hole communicated with the first contact hole; forming a pixel electrode on the first region of the black matrix, and inside the first contact hole and the second contact hole, and the pixel electrode is electrically connected to drain electrode through the first contact hole and the second contact hole; and forming a common electrode on the second region of the black matrix, and the common electrode and the pixel electrode are arranged alternately on the array substrate.

Wherein, between the step of forming the planarization passivation layer and forming the black matrix, the method further includes: forming a color filter layer on the planarization passivation layer, and the color filter layer is provided with a third contact hole that is communicated with the first contact hole and the second contact hole such that the pixel electrode is electrically connected to the drain electrode through the first contact hole, the second contact hole and the third contact hole.

Wherein, the source electrode, the drain electrode and the data line are formed through a same mask process.

Wherein, in the step of forming a black matrix on the planarization passivation layer includes: forming a light shielding layer having an entire surface on the planarization passivation layer; and performing a patterning process to the light shielding layer in order to form the black matrix.

Wherein, after the step of forming the pixel electrode and the common electrode, the method further includes: forming a protective layer on the pixel electrode and the common electrode.

The present invention provides an array substrate, wherein, the array substrate includes: a base substrate; a gate electrode, an insulation layer and an active semiconductor layer sequentially formed on a base substrate; a source electrode and a drain electrode formed on the active semiconductor layer; a data line formed on the insulation layer; a planarization passivation layer formed on the source electrode, the drain electrode, the data line and the insulation layer, and the planarization passivation layer is provided with a first contact hole that reveals a surface of the drain electrode; a black matrix formed on the planarization passivation layer, wherein, the black matrix includes a first region and a second region, the first region of the black matrix is correspondingly located above the source electrode and the drain electrode, the second region of the black matrix is correspondingly located above the data line, and the first region of the black matrix is provided with a second contact hole communicated with the first contact hole; a pixel electrode formed on the first region of the black matrix, and inside the first contact hole and the second contact hole, and the pixel electrode is electrically connected to drain electrode through the first contact hole and the second contact hole; and a common electrode formed on the second region of the black matrix, and the common electrode and the pixel electrode are arranged alternately on the array substrate.

Wherein, the array substrate further includes: a color filter layer formed on the planarization passivation layer, and the color filter layer is provided with a third contact hole that is communicated with the first contact hole and the second contact hole such that the pixel electrode is electrically connected to the drain electrode through the first contact hole, the second contact hole and the third contact hole.

Wherein, the source electrode, the drain electrode and the data line are formed through a same mask process.

Wherein, the array substrate further includes: a protective layer formed on the pixel electrode and the common electrode.

The present invention provides a liquid crystal display panel, wherein, the liquid crystal display panel comprises a first substrate and a second substrate which are disposed at an interval and a liquid crystal filled between the first substrate and the second substrate, wherein, one of the first substrate and the second substrate is an array substrate, and the array substrate comprises: a base substrate; a gate electrode, an insulation layer and an active semiconductor layer sequentially formed on a base substrate; a source electrode and a drain electrode formed on the active semiconductor layer; a data line formed on the insulation layer; a planarization passivation layer formed on the source electrode, the drain electrode, the data line and the insulation layer, and the planarization passivation layer is provided with a first contact hole that reveals a surface of the drain electrode; a black matrix formed on the planarization passivation layer, wherein, the black matrix includes a first region and a second region, the first region of the black matrix is correspondingly located above the source electrode and the drain electrode, the second region of the black matrix is correspondingly located above the data line, and the first region of the black matrix is provided with a second contact hole communicated with the first contact hole; a pixel electrode formed on the first region of the black matrix, and inside the first contact hole and the second contact hole, and the pixel electrode is electrically connected to drain electrode through the first contact hole and the second contact hole; and a common electrode formed on the second region of the black matrix, and the common electrode and the pixel electrode are arranged alternately on the array substrate.

Wherein, the array substrate further includes: a color filter layer formed on the planarization passivation layer, and the color filter layer is provided with a third contact hole that is communicated with the first contact hole and the second contact hole such that the pixel electrode is electrically connected to the drain electrode through the first contact hole, the second contact hole and the third contact hole.

Wherein, the source electrode, the drain electrode and the data line are formed through a same mask process.

Wherein, the array substrate further includes: a protective layer formed on the pixel electrode and the common electrode.

In a liquid crystal display panel, an array substrate and a manufacturing method for the same of the embodiment of the present invention, through designing a black matrix for light shielding, and an insulation layer between a pixel electrode and other structures in order to reduce the type and the number of the masks, simplify the manufacturing process and decrease the production cost. Besides, a distance between the black matrix located above a data line and the data line is shorten such that lights of a pixel emitting out through an adjacent pixel is avoided in order to reduce the light leakage at a large viewing angle.

DETAILED DESCRIPTION OF THE PREFERRED EMBODIMENT

The following will combine the figures in the embodiment of the present invention to describe the technology solution of the exemplary embodiment of the present invention clearly and completely.

Figure 2:
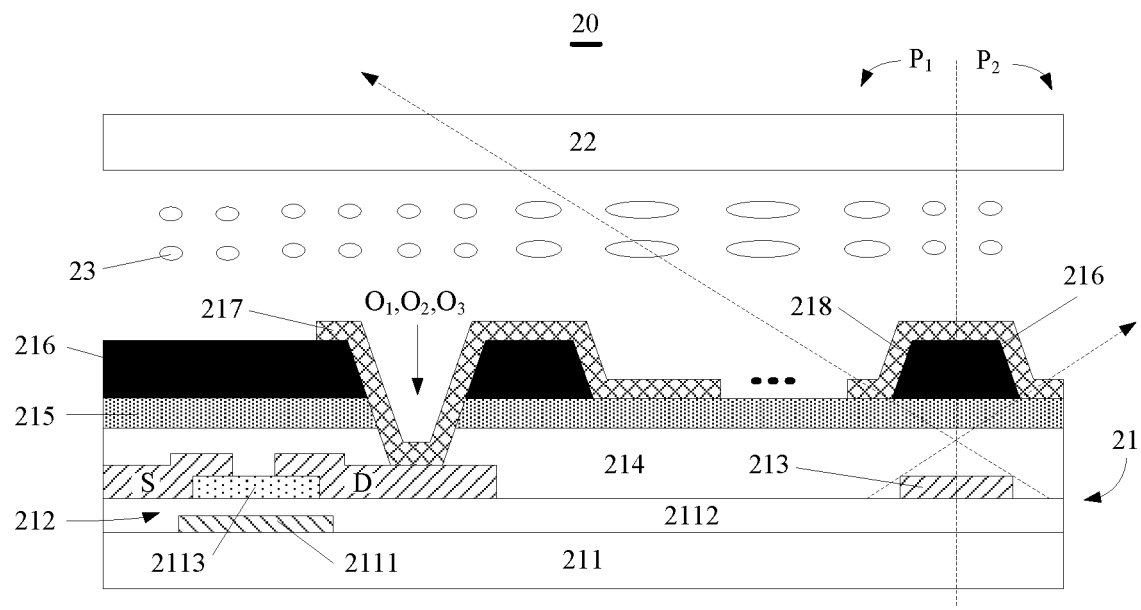
FIG. 2 is a structural cross-sectional view of a liquid crystal display panel of an embodiment of the present invention.

FIG. 2 is a structural cross-sectional view of a liquid crystal display panel of an embodiment of the present invention. As shown in FIG. 2, the liquid crystal display panel 20 includes an array substrate (also known as a Thin Film Transistor Substrate or a TFT substrate) 21 and a color filter substrate (also known as a CF substrate) 22 which are disposed oppositely and a liquid crystal (liquid crystal molecules) 23 clamped between the array substrate 21 and the color filter substrate 22. Wherein, the liquid crystal 23 is located in a liquid crystal cell overlapped and combined by the array substrate 21 and the color filter substrate 22.

The array substrate 21 includes a base substrate 211, a thin film transistor 212 formed on the substrate 211, a data line 213, a planarization passivation layer 214, a color filter layer 215, a black matrix 216, a pixel electrode 217 and a common electrode 218. Wherein, the thin film transistor 212 includes a gate electrode 2111, an insulation layer 2112 and an active semiconductor layer (AS) 2113 which are sequentially formed on the base substrate 211 and a source electrode S and a drain electrode D which are formed on the active semiconductor layer 2113. The insulation layer 2112 is a gate insulation layer (GI).

The data line 213 is formed on the insulation layer 2112, and is disposed at an interval with respect to the thin film transistor 212. The planarization passivation layer 214 is formed on the source electrode S, the drain electrode D, the data line 213 and the insulation layer 2112, and is provided with a first contact hole $O_1$ that reveals a surface of the drain electrode D.

The color filter layer 215 is formed on the planarization passivation layer 214, and is provided with a third contact hole $O_3$ that is communicated with the first contact hole $O_1$. The black matrix 216 is formed on the planarization passivation layer 214 such that the color filter layer 215 is located between the planarization passivation layer 214 and the black matrix 216. The black matrix 216 includes a first region and a second region. The first region of the black matrix 216 is correspondingly located above the source electrode S and the drain electrode D, and is provided with a second contact hole $O_2$ which is communicated with the first contact hole $O_1$ and the third contact hole $O_3$. The second region of the black matrix 216 is correspondingly located above the data line 213. The pixel electrode 217 is formed on the first region of the black matrix 216 and inside the first contact hole $O_1$ and the second contact hole $O_2$ such that the pixel electrode 217 is electrically connected with the drain electrode through the first contact hole $O_1$, the second contact hole $O_2$ and the third contact hole $O_3$. A common electrode 218 is formed on the second region of the black matrix 216, and the common electrode 218 and the pixel electrode 217 are disposed alternately on the array substrate 21. At this time, the liquid crystal display panel 20 can be regarded as an IPS (In-Plane Switching, a transverse electric field effect display) mode.

It should be understood that, in another embodiment of the present invention, the color filter layer 215 can be formed on a transparent substrate 221 of the color filter substrate 22 shown in FIG. 2. At this time, the color filter layer 215 does not require to provide with the third contact hole $O_3$. Correspondingly, the black matrix 216 having the above structure is directly formed on the planarization passivation layer 214. The second contact hole $O_2$ formed at the first region of the black matrix 216 is directly communicated with the first contact hole $O_1$. The pixel electrode 217 is formed on the first region of the black matrix 216 and is formed inside the first contact hole $O_1$ and the second contact hole $O_2$ such that the pixel electrode 217 is electrically connected to the drain electrode only through the first contact hole $O_1$ and the second contact hole $O_2$.

Of course, the array substrate 21 further has other structures of the conventional art, for example, a protective layer formed on the pixel electrode 217 and the common electrode 218, not repeating any more.

The black matrix 216 of the embodiment of the present invention can be used for light shielding, and also be used as an insulation layer between the pixel electrode 217 and the color filter layer 215. Comparing with the conventional art shown in FIG. 1, the black matrix 216 replaces the second planarization passivation layer 115 (PFA layer) shown in FIG. 1. Besides, because the black matrix 216 does not be disposed on the color filter substrate 22, the color filter substrate 22 does not required to be provided with the third planarization passivation layer 122 which covers on the black matrix 121 shown in FIG. 1. The above shows that comparing with the conventional art, the layered structure of the liquid crystal display panel 20 of the embodiment of the present invention is less so as to reduce the type and the number of the masks required by the manufacturing process, simplify the manufacturing process, and decrease the production cost.

Figure 1:
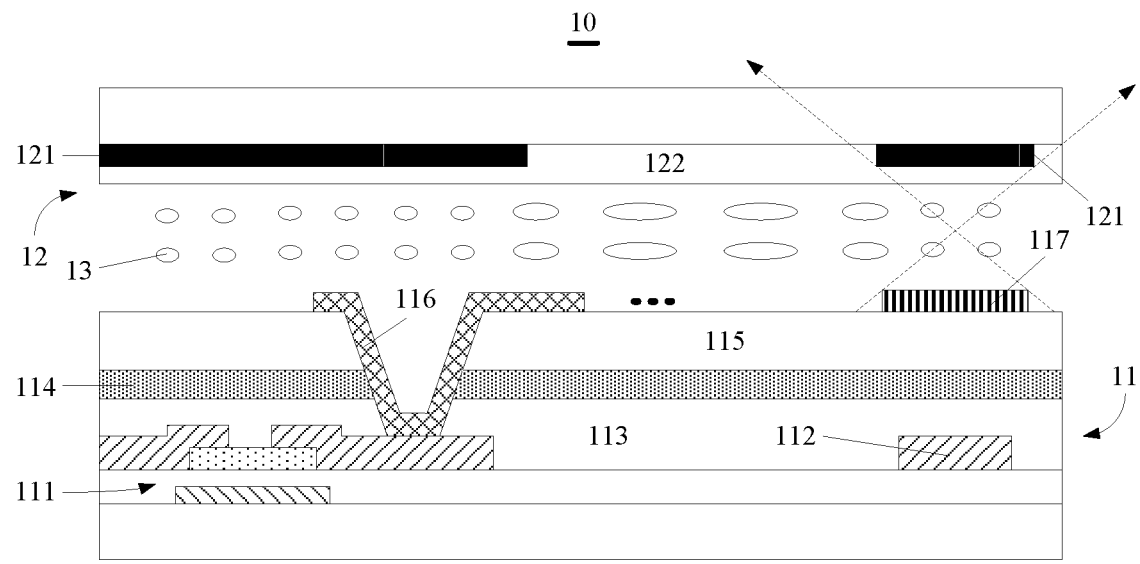
FIG. 1 is a structural cross-sectional view of a liquid crystal display panel of an embodiment of the conventional art.

Besides, comparing with the conventional art in FIG. 1, the black matrix 216 and the data line 213 of the present embodiment of the present invention is disposed at a same substrate, a distance between the black matrix 216 (the second region of the black matrix 216) and the data line 213 is shorten so that emitting lights of the pixel P1 through an adjacent pixel P2 can be reduced as much as possible in order to reduce the light leakage when viewing at a large viewing angle.

Figure 3:
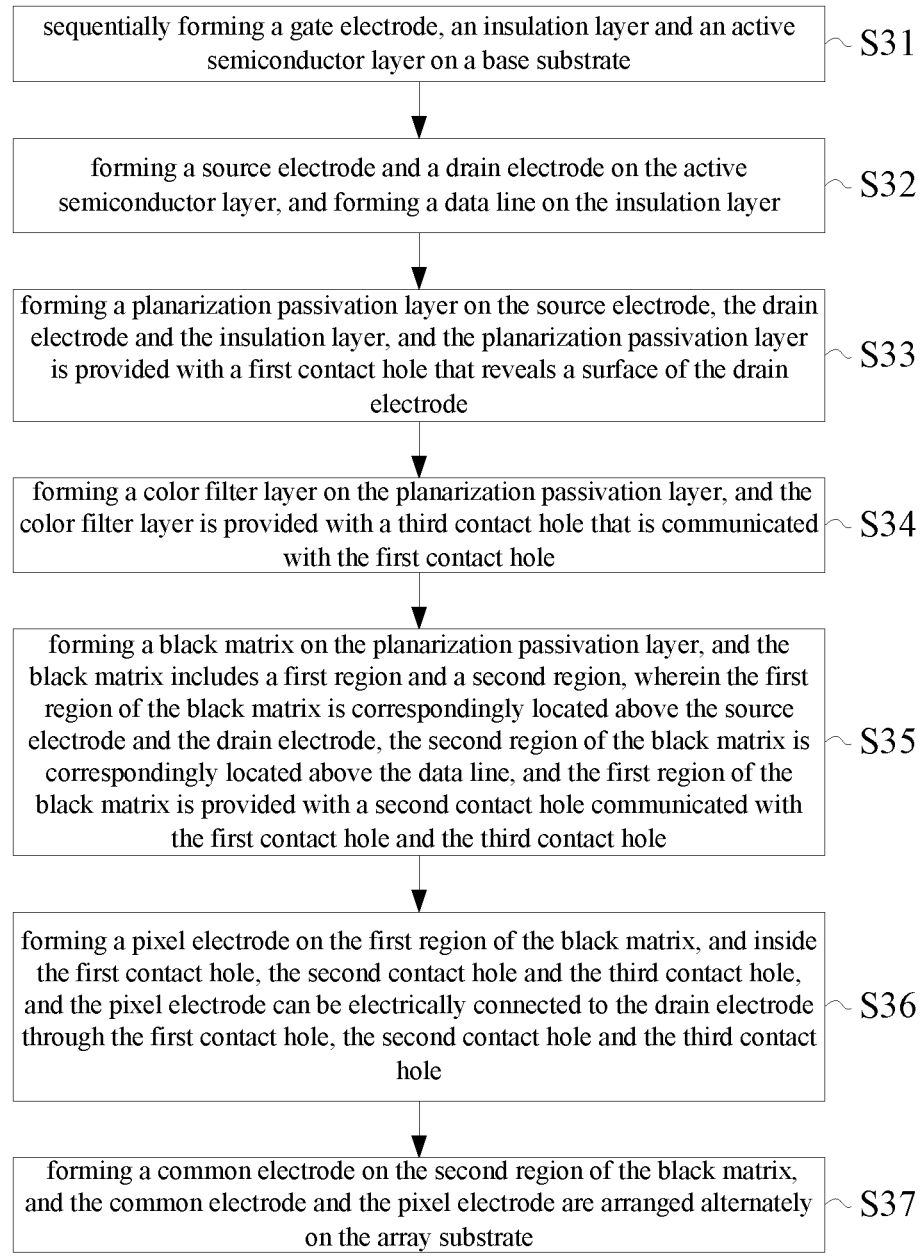
FIG. 3 is a flow chart of a manufacturing method for an array substrate of an embodiment of the present invention.
Figure 4:
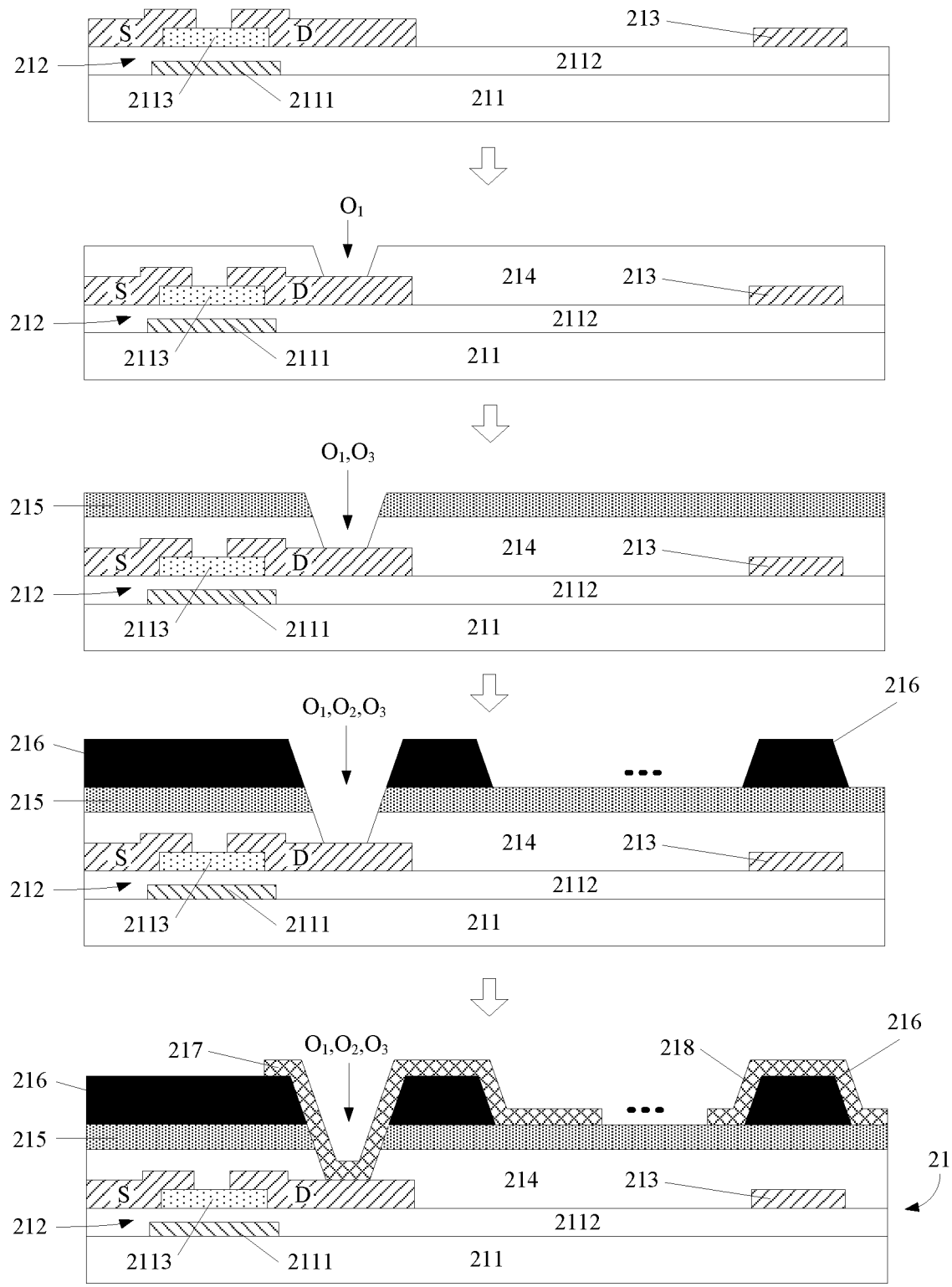
FIG. 4 is a schematic diagram of using the method shown in FIG. 3 to manufacture the array substrate.

FIG. 3 is a flow chart of a manufacturing method for an array substrate of an embodiment of the present invention, used for manufacturing the array substrate shown in FIG. 2. Combined with FIG. 2 to FIG. 4, the method includes:

S31: sequentially forming a gate electrode, an insulation layer and an active semiconductor layer on a base substrate;

As shown in FIG. 4, the base substrate 211 is used for forming an array substrate 21 of the liquid crystal display panel 20, and the base substrate 211 can be a glass base body, a plastic base body or a flexible base body.

The embodiment of the present invention can adopt methods such as the chemical vapor deposition, the vacuum evaporation, the Plasma Enhanced Chemical vapor deposition (PECVD) and the sputtering to form the gate electrode 2111 and the insulation layer 2112 and the active semiconductor layer 2113 on the base substrate 211. In another embodiment, using two masks to respectively form the gate electrode 2111 having a preset pattern and an active semiconductor layer 2113.

S32: forming a source electrode and a drain electrode on the active semiconductor layer, and forming a data line on the insulation layer;

With reference to FIG. 4, it can adopt a same mask to form the source electrode S, the drain electrode D and the data line 213. That is, the source electrode S, the drain electrode D and the data line 213 are formed through a same mask process. Of course, different mask processes can also be adopted to form the source electrode S, the drain electrode D and the data line 213.

S33: forming a planarization passivation layer on the source electrode, the drain electrode and the insulation layer, and the planarization passivation layer is provided with a first contact hole $O_1$ that reveals a surface of the drain electrode.

The embodiment of the present invention can adopt an etching solution including phosphoric acid, nitric acid, acetic acid and deionized water to perform etching the planarization passivation layer 214 in order to obtain the planarization passivation layer 214 having the first contact hole $O_1$. Of course, a drying etching method can also be adopted.

S34: forming a color filter layer on the planarization passivation layer, and the color filter layer is provided with a third contact hole that is communicated with the first contact hole;

Combined with FIG. 2, color filter layer 215 of two adjacent pixels P1-P2 allows light having different colors to pass through, and the color filter layer 215 of the two adjacent pixels can be made by a same process.

S35: forming a black matrix on the planarization passivation layer, and the black matrix includes a first region and a second region. The first region of the black matrix is correspondingly located above the source electrode and the drain electrode. The second region of the black matrix is correspondingly located above the data line, and the first region of the black matrix is provided with a second contact hole communicated with the first contact hole and the third contact hole.

Wherein, the step of forming the black matrix 216 specifically is: forming a light shielding layer having an entire surface on the planarization passivation layer 214; then, performing a patterning process to the light shielding layer in order to form the black matrix 216, wherein the patterning process is etching. The embodiment of the present invention can also adopt a mask to directly form the black matrix 216 having the structure shown in FIG. 2 on the planarization passivation layer 214.

S36: forming a pixel electrode on the first region of the black matrix, and inside the first contact hole, the second contact hole and the third contact hole, and the pixel electrode can be electrically connected to the drain electrode through the first contact hole, the second contact hole and the third contact hole.

S37: forming a common electrode on the second region of the black matrix, and the common electrode and the pixel electrode are arranged alternately on the array substrate.

Of course, the array substrate 21 further has other structures of the conventional art. For example, array substrate 21 includes a protective layer for insulating the liquid crystal 23. Therefore, after forming the pixel electrode 217 and the common electrode 218, the method further includes: forming a protective layer on the pixel electrode 217 and the common electrode 218.

Figure 5:
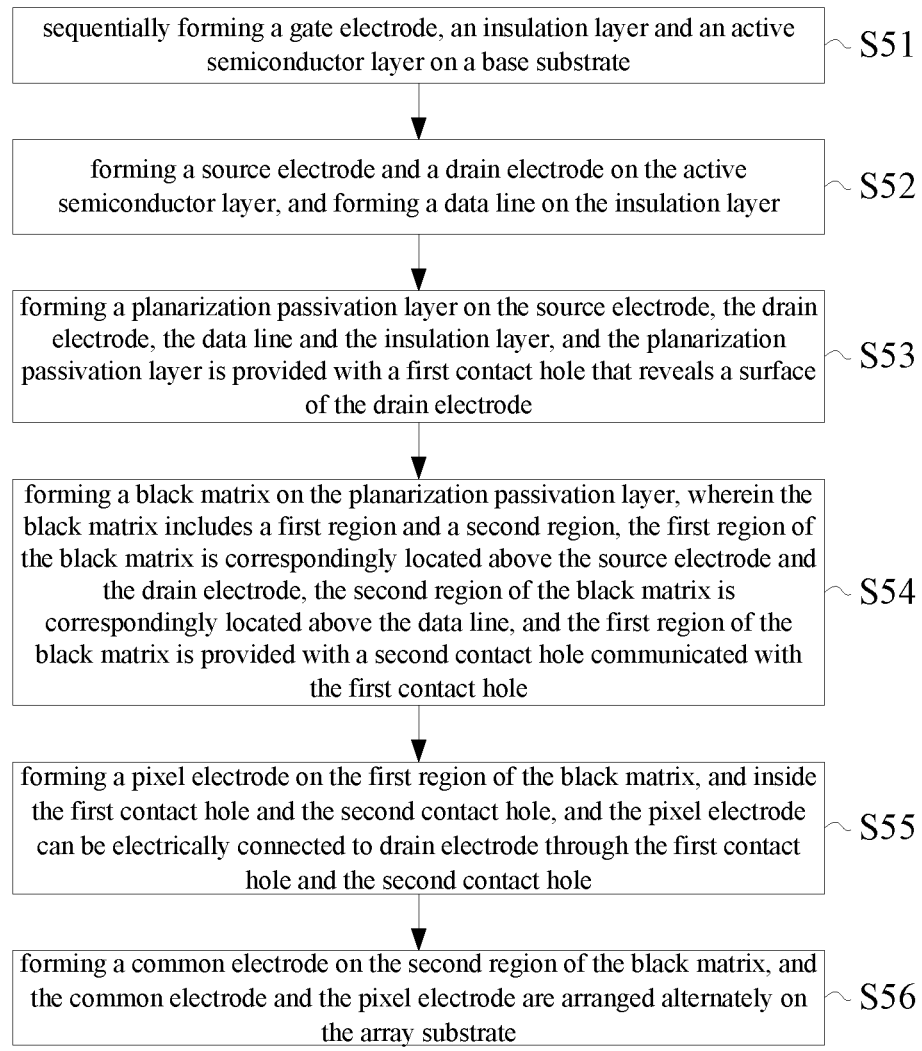
FIG. 5 is a flow chart of a manufacturing method for an array substrate of another embodiment of the present invention.

For the color filter layer 215 formed on the transparent substrate 221 of the color filter substrate 22, the color filter layer 215 does not require providing the third contact hole $O_3$, the manufacturing method for the embodiment of the present invention is shown in FIG. 5, including:

S51: sequentially forming a gate electrode, an insulation layer and an active semiconductor layer on a base substrate;

S52: forming a source electrode and a drain electrode on the active semiconductor layer, and forming a data line on the insulation layer;

S53: forming a planarization passivation layer on the source electrode, the drain electrode, the data line and the insulation layer, and the planarization passivation layer is provided with a first contact hole $O_1$ that reveals a surface of the drain electrode.

S54: forming a black matrix on the planarization passivation layer, wherein, the black matrix includes a first region and a second region, the first region of the black matrix is correspondingly located above the source electrode and the drain electrode, the second region of the black matrix is correspondingly located above the data line, and the first region of the black matrix is provided with a second contact hole communicated with the first contact hole.

S55: forming a pixel electrode on the first region of the black matrix, and inside the first contact hole and the second contact hole, and the pixel electrode can be electrically connected to drain electrode through the first contact hole and the second contact hole.

S56: forming a common electrode on the second region of the black matrix, and the common electrode and the pixel electrode are arranged alternately on the array substrate.

That is, the black matrix 216 having the structure shown in FIG. 2 is directly formed on the planarization passivation layer 214, the second contact hole $O_2$ formed at the first region of the black matrix 216 is directly communicated with the first contact hole $O_1$, the pixel electrode 217 is formed on the first region of the black matrix 216, and inside the first contact hole $O_1$ and the second contact hole $O_2$ such that the pixel electrode 217 is electrically connected to the drain electrode D only through the first contact hole $O_1$ and the second contact hole $O_2$.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A manufacturing method for an array substrate, comprising:
    sequentially forming a gate electrode, an insulation layer and an active semiconductor layer on a base substrate;
    forming a source electrode and a drain electrode on the active semiconductor layer;
    forming a data line on the insulation layer;
    forming a planarization passivation layer on the source electrode, the drain electrode, the data line and the insulation layer, and the planarization passivation layer is provided with a first contact hole that reveals a surface of the drain electrode;
    forming a color filter layer on the planarization passivation layer, and the color filter layer is provided with a third contact hole;
    forming a black matrix on the color filter layer, wherein, the black matrix includes a first region and a second region, the first region of the black matrix is correspondingly located above the source electrode and the drain electrode, the second region of the black matrix is correspondingly located above the data line, and the first region of the black matrix is provided with a second contact hole communicated with the first contact hole;
    forming a pixel electrode on the first region of the black matrix, and inside the first contact hole and the second contact hole, and the pixel electrode is electrically connected to drain electrode through the first contact hole and the second contact hole, wherein the pixel electrode is directly contacted with the black matrix;
    forming a common electrode on the second region of the black matrix, and the common electrode and the pixel electrode are arranged alternately on the array substrate, wherein the common electrode is directly contacted with the second region of the black matrix; and
    wherein the third contact hole of the color filter layer is communicated with the first contact hole and the second contact hole such that the pixel electrode is electrically connected to the drain electrode through the first contact hole, the second contact hole and the third contact hole.

2. The method according to claim 1, wherein, the source electrode, the drain electrode and the data line are formed through a same mask process.

3. The method according to claim 1, wherein,
    in the step of forming a black matrix on the color filter layer includes:
    forming a light shielding layer having an entire surface on the planarization passivation layer; and
    performing a patterning process to the light shielding layer in order to form the black matrix.

4. The method according to claim 1, wherein, after the step of forming the pixel electrode and the common electrode, the method further includes:
    forming a protective layer on the pixel electrode and the common electrode.

5. An array substrate, wherein, the array substrate includes:
    a base substrate;
    a gate electrode, an insulation layer and an active semiconductor layer sequentially formed on a base substrate;
    a source electrode and a drain electrode formed on the active semiconductor layer;
    a data line formed on the insulation layer;
    a planarization passivation layer formed on the source electrode, the drain electrode, the data line and the insulation layer, and the planarization passivation layer is provided with a first contact hole that reveals a surface of the drain electrode;
    a color filter layer formed on the planarization passivation layer, and the color filter layer is provided with a third contact hole;
    a black matrix formed on the color filter layer, wherein, the black matrix includes a first region and a second region, the first region of the black matrix is correspondingly located above the source electrode and the drain electrode, the second region of the black matrix is correspondingly located above the data line, and the first region of the black matrix is provided with a second contact hole communicated with the first contact hole;
    a pixel electrode formed on the first region of the black matrix, and inside the first contact hole and the second contact hole, and the pixel electrode is electrically connected to drain electrode through the first contact hole and the second contact hole, wherein the pixel electrode is directly contacted with the black matrix; and
    a common electrode formed on the second region of the black matrix, and the common electrode and the pixel electrode are arranged alternately on the array substrate, wherein the common electrode is directly contacted with the second region of the black matrix; and wherein the third contact hole of the color filter layer is communicated with the first contact hole and the second contact hole such that the pixel electrode is electrically connected to the drain electrode through the first contact hole, the second contact hole and the third contact hole.

6. The array substrate according to claim 5, wherein, the source electrode, the drain electrode and the data line are formed through a same mask process.

7. The array substrate according to claim 5, wherein, the array substrate further includes:
a protective layer formed on the pixel electrode and the common electrode.

8. A liquid crystal display panel, wherein, the liquid crystal display panel comprises a first substrate and a second substrate which are disposed at an interval and a liquid crystal filled between the first substrate and the second substrate, wherein, one of the first substrate and the second substrate is an array substrate, and the array substrate comprises:
a base substrate;
a gate electrode, an insulation layer and an active semiconductor layer sequentially formed on a base substrate;
a source electrode and a drain electrode formed on the active semiconductor layer;
a data line formed on the insulation layer;
a planarization passivation layer formed on the source electrode, the drain electrode, the data line and the insulation layer, and the planarization passivation layer is provided with a first contact hole that reveals a surface of the drain electrode;
a color filter layer formed on the planarization passivation layer, and the color filter layer is provided with a third contact hole;
a black matrix formed on the color filter layer, wherein, the black matrix includes a first region and a second region, the first region of the black matrix is correspondingly located above the source electrode and the drain electrode, the second region of the black matrix is correspondingly located above the data line, and the first region of the black matrix is provided with a second contact hole communicated with the first contact hole;
a pixel electrode formed on the first region of the black matrix, and inside the first contact hole and the second contact hole, and the pixel electrode is electrically connected to drain electrode through the first contact hole and the second contact hole, wherein the pixel electrode is directly contacted with the black matrix; and
a common electrode formed on the second region of the black matrix, and the common electrode and the pixel electrode are arranged alternately on the array substrate, wherein the common electrode is directly contacted with the second region of the black matrix; and
wherein the third contact hole of the color filter layer is communicated with the first contact hole and the second contact hole such that the pixel electrode is electrically connected to the drain electrode through the first contact hole, the second contact hole and the third contact hole.

9. The liquid crystal display panel according to claim 8, wherein, the source electrode, the drain electrode and the data line are formed through a same mask process.

10. The liquid crystal display panel according to claim 8, wherein,
the array substrate further includes:
a protective layer formed on the pixel electrode and the common electrode.

* * * * *